United States Patent
Fishman et al.

(10) Patent No.: US 6,607,311 B1
(45) Date of Patent: Aug. 19, 2003

(54) METHOD AND SYSTEM TRANSMITTING OPTICAL SIGNALS GENERATED BY MULTI-LINE SOURCES VIA WDM OPTICAL NETWORK

(75) Inventors: Ilya M. Fishman, Palo Alto, CA (US); Yu Sheng Bai, Redwood City, CA (US); Anat Z. Sneh, Mountain View, CA (US)

(73) Assignee: Optimight Communications, Inc., Mountain View, CA (US)

( * ) Notice: Subject to any disclaimer, the term of this patent is extended or adjusted under 35 U.S.C. 154(b) by 0 days.

(21) Appl. No.: 09/527,040

(22) Filed: Mar. 16, 2000

(51) Int. Cl.[7] ................................................. H04J 14/02
(52) U.S. Cl. ............................. 398/79; 398/81; 398/50; 398/142; 398/144; 398/83
(58) Field of Search ................................. 359/124, 133, 359/161, 128

(56) References Cited

U.S. PATENT DOCUMENTS 6,366,376 B1 * 4/2002 Miyata et al. ............... 359/124
6,490,064 B1 * 12/2002 Sakamoto et al. .......... 359/124

OTHER PUBLICATIONS

F. Forgheieri, et al, "Fiber Nonlinearities and Their Impact on Transmission Systems", Chapter 8 in Optical Fiber Communication Systems, vol. 111A, Ed.I Kaminow, Academic Press, San Diego, p. 196, 1997.

E. Goldstein, et al, "Scaling Limitations in Transparnt Optical Networks Due to Low–Level Crosstalk", *IEEE PTL*, vol. &, p. 93, 1995.

" Fiber Optic Test and Measurement", edited by D. Derickson, Appendix A, HP Company, 1998.

J. Veselka and S. Korotky, "Puls Generation for Soliton Systems Using Lithium Niobate Modulators", *IEEE J Sel. Topics in Quantum Electronics*, vol. 2, p. 300, 1996.

R. Spanke, et al, "Architectures for Large Nonblocking Optical Space Switches", *IEEE J*, QE, QE–22, p. 964,1986.

D. Blumenthal, et al, "BER Floor due to Heterodyne Coherent Crosstalk in Space Photonic Switches for WDM Networks", *IEEE PTL*, vol. 8, p. 284,1996.

* cited by examiner

*Primary Examiner*—Kinfe-Michael Negash
(74) *Attorney, Agent, or Firm*—Arter & Hadden LLP

(57) ABSTRACT

A transmission of optical signals generated by multi-line optical sources is provided via multichannel WDM optical network. Each multi-line optical source generates optical spectral lines within designated spectral range associated with the spectral window allocated for corresponding WDM channel, and comprises a plurality of spectral lines. Spectral lines are substantially narrower than the spectral separation between the lines.

10 Claims, 4 Drawing Sheets

METHOD AND SYSTEM TRANSMITTING OPTICAL SIGNALS GENERATED BY MULTI-LINE SOURCES VIA WDM OPTICAL NETWORK

FIELD OF THE INVENTION

The present invention relates to optical multichannel transmission via optical fiber communication network, and more particularly to Wavelength-Division Multiplexing (WDM) transmission systems and methods utilizing multi-line optical sources.

BACKGROUND OF THE INVENTION

Modem Dense Wavelength Division Multiplexing (DWDM) systems utilize narrow-band receivers equipped with interference filters, fiber Bragg gratings, or Array Waveguide Gratings and stable narrow-band light sources such as Distributed FeedBack (DFB) or Distributed Bragg Resonator (DBR) semiconductor lasers. This transmitter/receiver technology allows for sending multiple information channels over one physical fiber line. Conventional WDM systems may comprise 80 or more information channels propagating in a single glass fiber within the spectral band of about 1550 nm corresponding to minimum optical loss, and separated in frequency domain by internationally accepted 50, 100 or 200 GHz (ITU grid). To provide reliable and stable multichannel transmission, the light sources and receivers/filters must have high spectral accuracy. The bandwidths of temperature stabilized DFB are typically several MHz. This very narrow spectral output and respective long coherence length significantly limit the next generation of WDM systems development. For example, the laser output power per WDM channel is limited by interference of mutually coherent electromagnetic fields propagating in adjacent WDM channels.

There are two types of processes causing coherent interference, or cross-talk. The first type relates to nonlinear interaction of adjacent WDM channels, the most pronounced effects of which are known as four-wave mixing and cross-phase modulation. Four-wave mixing is a process where interaction of three strong fields of different optical frequencies produces the fourth field having a frequency that falls, together with the other WDM channel frequencies, within a receiver bandwidth. The four-wave mixing product is detected together with the WDM signal and produces beating noise. Cross-phase modulation is another optical nonlinear process where the optical pulse is distorted by perturbation of the fiber index of refraction due to optical Kerr effect induced by optical pulses propagating in adjacent WDM channels.

Four-wave mixing and cross-phase modulation set fundamental limits for maximum optical power per WDM channel that can be launched into the fiber. These effect also determine minimum frequency separation between the WDM channels and the minimum fiber chromatic dispersion required to reduce the coherence length between electromagnetic fields of different frequencies [F. Forghieri, R. W. Tkach, and A. R. Chraplyvy, "Fiber nonlinearities and their impact on transmission systems", Chapter 8 in *Optical Fiber Communication Systems*, Vol. IIIA, Ed. I. P. Kaminow and T. L. Koch, Academic Press, San Diego, 1997].

Another type of processes causing WDM transmission impairment arises from coherent cross-talk related to non-complete extinction of WDM signals from WDM system components such as add-drop multiplexers (ADMs) and optical cross-connects (OXCs). Even for a relatively large extinction ratio, for example, about −20 dB, the remains of the dropped traffic mixed with added traffic produce −10 dB amplitude noise if the cross-talk is coherent. If the cross-talk is incoherent, the respective noise is ~10 dB less. The coherent cross-talk power penalty scales rapidly with the number of cross-talk terms beating at the receiver imposing severe limitations onto component specifications of ADMs and OXCs [E. L. Goldstein, et al., IEEE PTL, Vol. 7, p.93, 1995]. In the next generation WDM networks, with optical switching and wavelength routing functionalities introduced, the cross-talk terms will be generated at each add-drop and cross-connect node. Suppression of coherent cross-talk is an important requirement to these new networks design.

SUMMARY OF THE INVENTION

It is therefore the main object of the present invention is to reduce coherent cross-talk between WDM channels of WDM optical network and improve the quality of signal transmission.

Accordingly the present invention provides method and system of transmitting optical signals generated by multi-line optical source via multichannel optical network.

A plurality of multi-line sources generates a corresponding plurality of optical signals within designated spectral ranges. Each designated spectral range $\Delta\Omega$ comprises N spectral lines, each said spectral line having a spectral width $\Delta\omega$, where $\Delta\omega << \Delta\Omega/N-1$. Generated light is modulated within each WDM optical channel by a respective electrical signal for obtaining a respective modulated optical signal. A ratio of $\Delta\Omega/N-1$ defines a spectral separation between adjacent spectral lines, and this spectral separation exceeds a spectral bandwidth of the electrical signal for each optical channel. The modulated optical signals are propagating via respective WDM optical channels trough an optical fiber of the WDM optical network. Depending on the applications, a dispersion shifted fiber (DSF) or a standard single mode fiber (SMF) may be utilized. The propagated optical signals are detected and non-linear optical interaction of the propagated optical signals are suppressed.

According to another aspect of the present invention a multichannel WDM optical network comprises at least two WDM point-to-point systems interconnected by an optical cross-connect. This network comprises a plurality of multi-channel optical sources for generating a plurality of optical signals within designated spectral ranges corresponding to spectral ranges of a plurality of channels of the WDM optical network. Each designated spectral range comprises a plurality of spectral lines evenly separated therebetween. A spectral separation between adjacent spectral lines exceeds a spectral bandwidth of a signal transmitted via each WDM channel. Incorporation of this multi-line source to the WDM network allows for substantial suppression of coherent cross talk residue associated with optical cross connect.

BRIEF DESCRIPTION OF THE DRAWINGS

The forging and other features and advantages of the present invention will be described by way of example with references to the accompanying drawings in which.

DETAILED DESCRIPTION OF THE INVENTION

The purpose of the present invention is to develop method and system that significantly reduces coherent cross-talk between WDM channels. The quality of transmission of signals through a WDM optical network depends on the ability of the transmission protocol to suppress the products of nonlinear interaction of the optical fields belonging to adjacent WDM channels. If these fields are mutually incoherent the system impairments are reduced because these fields do not interfere with each other. To reduce the degree of channel-to-channel mutual coherence, the method and system of the present invention utilize optical sources having broad optical spectra within each WDM spectral window. It is known that broadband sources have shorter coherence lengths (path length difference that allows observation of mutual interference) than narrow-band sources. Thus, utilization of broadband sources would provide substantial reduction of both linear and nonlinear coherent cross-talk. However, typical broadband sources such as light emitting diodes (LEDs) or Erbium-Doped Fiber Amplifiers (EDFAs) are not adequate for WDM applications. These sources have continuous spectral density in the range of emitted frequencies $\Delta\Omega$ and are characterized by excessive Relative Intensity Noise (RIN). RIN manifests itself as fluctuations of photoelectric current due to low-frequency beating between fields of different optical frequencies. An important RIN attribute is that the source's RIN power is inversely proportional to $\Delta\Omega$ [Fiber Optic Test and Measurement, ed. By D. Derickson, Appendix A, HP Company, 1998]. For bandwidth $\Delta\Omega$ less than 100 GHz, RIN of a continuous spectral source significantly exceeds noise of other origins (electrical thermal noise and optical shot noise). The RIN spectral density depends on spectral distribution of source power. For example, if the source emits a series of narrow spectral lines separated by $\Delta\omega > B_0$, where $B_0$ is receiver bandwidth (with the spectral separation $\Delta\omega = 5$ GHz, 10 spectral lines may be transmitted in the 50 GHz window), the detector noise corresponding to the beating between these spectral lines does not contribute to the system noise.

The multi-frequency light source combines the advantages of short coherence time and low noise level, not exceeding the intensity noise level of a single-frequency laser. To characterize the multi-line light source, a correlation function $B(\tau)$ for electromagnetic fields $E(\tau)$ is introduced. For the source with many equally spaced spectral lines, the correlation function $$B(\tau) = \int_0^\infty E(t)E(t-\tau)\,dt \qquad (1)$$

is a periodic function of delay $\tau$ with period $\theta = 1/\Delta\omega$. The time delay where correlation remains substantial is $\tau_0 = 1/\Omega$. The shorter $\tau_0$ is, the less coherent is the source.

Figure 1:
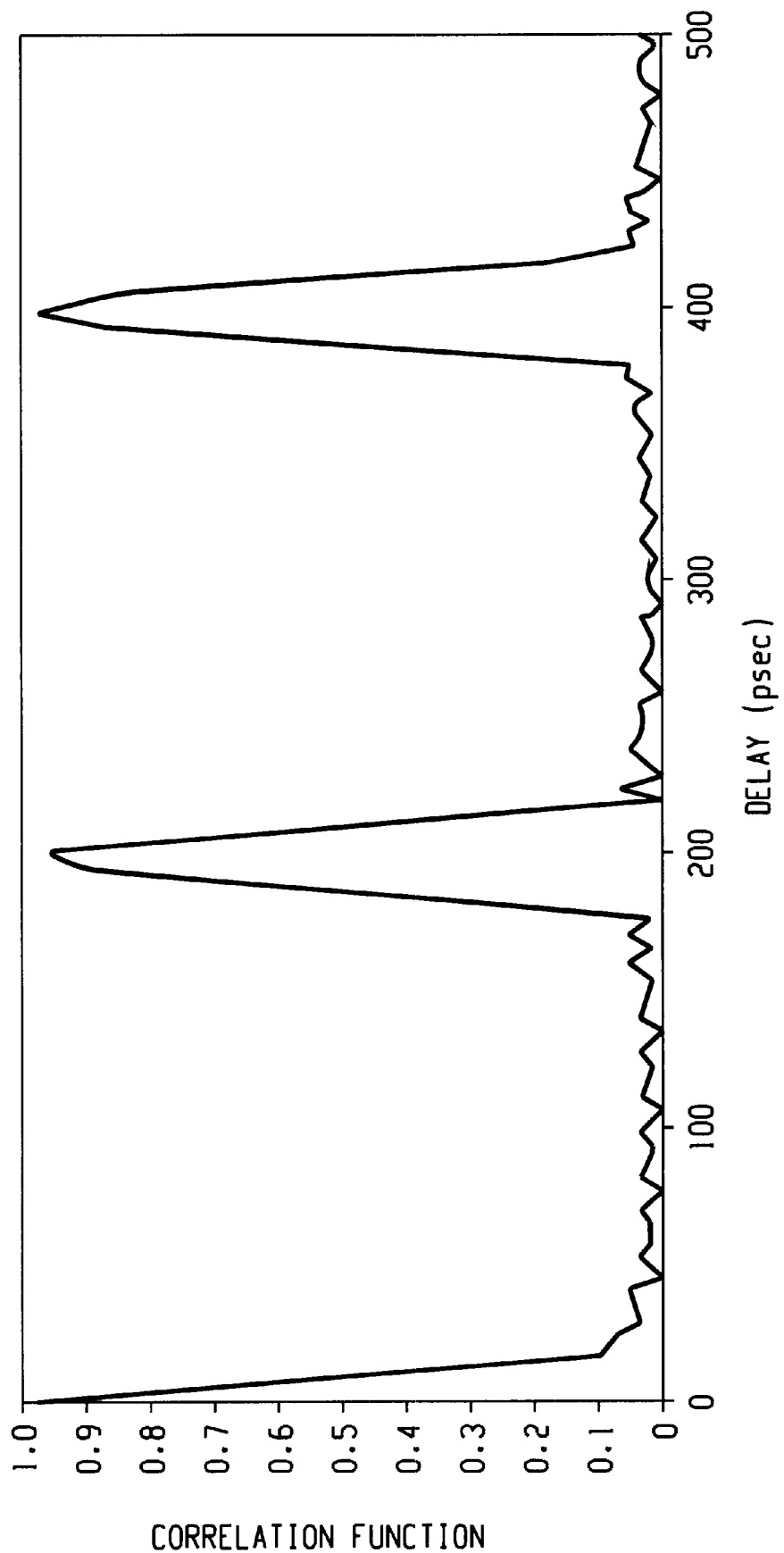
FIG. 1 shows correlation function of a multi-frequency line source with a frequency spacing of 5 GHz.

The correlation function for a multi-line source having 10 similar amplitude spectral lines separated by 5 GHz is shown in FIG. 1. The source with this correlation function produces less noise related to nonlinear channel-to-channel interference than a single frequency source. The crosstalk level $\epsilon = \Delta P_{NL}/P$, where $P$ and $\Delta P_{NL}$ are the launched signal power and power of 30 nonlinear optical products, respectively, is approximately given by [F. Forghieri, R. W. Tkach, and A. R. Chraplyvy, "Fiber nonlinearities and their impact on transmission systems", Chapter 8 in *Optical Fiber Communication Systems*, Vol. IIIA, Ed. I. P. Kaminow and T. L. Koch, Academic Press, San Diego, 1997]

$$\epsilon = 4(\gamma P L_e)^2 \eta \qquad (2)$$

where $\gamma$ is the nonlinear coefficient determined by the fiber type, $L_e$ is the fiber effective length (typically ~20 km), and $\eta$ is the interaction efficiency depending on the fiber dispersion and the WDM channel frequency spacing.

For the equal frequency spacing between the WDM channels, many nonlinear four-wave mixing products are falling within receiver bandwidth. However, only adjacent WDM channels contribute substantially to the nonlinear noise because the remote channels contribution is weakened by linear dispersion. In case of multi-line sources, the full optical power generated by interaction of all N lines is (for same average power) the same as for single line source. However, the electromagnetic fields corresponding to different nonlinear products are mutually incoherent. When signal (linear component) and noise (nonlinear component) are mixed on the detector, this mutual incoherence provides $$\frac{1}{\sqrt{N}}$$

reduction in optically induced noise. Respectively, electrical noise power is reduced by a factor of N.

For example, in a system with the frequency spacing of 100 GHz and the launch power 0 dBm per channel, the four-wave mixing product power is about 1% [F. Forghieri, R. W. Tkach, and A. R. Chraplyvy, "Fiber nonlinearities and their impact on transmission systems", Chapter 8 in *Optical Fiber Communication Systems*, Vol. IIIA, Ed. I. P. Kaminow and T. L. Koch, Academic Press, San Diego, 1997]. This term produces a power penalty of 1 dB when coherent interference with the main signal is considered. With a MLS, nonlinear channel-to-channel interaction is reduced since the average power of the signal is spread across a wider frequency range. For totally incoherent WDM channels, the power penalty is negligible (0.05 dB). Similar consideration may be applied to other nonlinear effects.

In WDM systems with optical Add-Drop Multiplexers (ADM) or Optical Cross-Connects (OXC), the multiplexer/demultiplexer filters separate the individual WDM channels to their corresponding ports. In this process, a certain amount of power leaks to each one of the other ports corresponding to other WDM channels. Thus, each port is contaminated by data from the other WDM channels. When all the channel ports are combined together to a single fiber, each leaked term interferes with its original channel, generating beating noise that falls within the detector bandwidth. Additional cross-talk arises from imperfect extinction at the switch fabric directing the signal to the drop port. When the dropped channel is regenerated and added back to the network, it interferes with the leakage field at the switch, again producing beating noise within the detector bandwidth. Hence, each node contributes a number of cross-talk residues which can be equal to the number of WDM channels.

The power penalty due to the coherent cross-talk in general scales as the number of cross-talk terms interfering at the detector. The approximate power penalty due to Q coherent cross-talk residues with a power cross-talk level $\Psi$ is given by [E. L. Goldstein et al., IEEE PTL, Vol. 7, p.93, 1995]:

$$P_c=-5 \log[1-4q^2Q\Psi] \quad (3)$$

where q=6.3 for a bit error rate BER=$10^{-10}$, and $P_c$ is the power penalty in dB. When the source coherence time is substantially shorter than the bit period, coherence between the fields disappears. Without interference, the incoherent cross-talk power penalty is:

$$P_i=-10 \log[1-Q\Psi] \quad (4)$$

For the same BER, the incoherent cross-talk power $P_i$ is about 20 dB lower than $P_c$.

The optical source that has short coherence time (and coherence length) and low RIN, is a MLS with the correlation function of FIG. 1. For the source with the correlation function of FIG. 1, the coherent cross-talk reduction is close to the level obtained with a continuous-spectrum broadband source. Thus, employing the MLS in a WDM network reduces the coherent cross-talk penalty from $P_c$ to values closer to $P_i$, or allows for increased capacity (number of nodes or number of channels) for the same cross-talk.

For optical networking applications $\Psi$ represents component power leakage cross-talk due to incomplete extinction. In a network with optical Add-Drop nodes, the number of component cross-talk terms N scales as the number of WDM channels multiplied by the number of nodes. Consider here a network with 40 wavelengths and 10 Add-Drop nodes. If the cross-talk in each MUX/ DMUX is similar to all non-adjacent channels, the maximum number of cross-talk residues generated in each node is 40. When passing through additional nodes, the cross-talk residues at each node adds up to the residues generated at the previous nodes. Thus, the worst case number of cross-talk components is 400. If the cross-talk is coherent and a required power penalty is 1 dB at BER=$10^{-10}$, then the individual component cross-talk level should be less than −52 dB. To maintain the combined cross-talk of the MUX/DMUX pair below −52 dB level, the non-adjacent channel cross-talk needs to be ≦−26 dB. Combined with additional limitations such as low loss, polarization independence, these parameters are hard to meet in any existing device technology, when a single component handles all channels simultaneously. As a result, more complex Add-Drop architectures are often used in an attempt to deliver the required capacity. The added complexity results in higher losses (often requiring additional internal amplifiers to compensate for the loss), substantially higher cost and limited functionality (e.g., fixed Add/Drop instead of a fully reconfigurable one). In comparison, if the network uses an incoherent source, the cross-talk level allowed in the above example is −31 dB, and therefore the non-adjacent MUX/DMUX channel cross-talk allowed is as high as −16 dB. These values demonstrate how incorporation of incoherent sources substantially reduces requirements to component performance in optical networks (in this case, the MUX/DMUX pair).

The multi-line sources improve overall WDM system performance. The design and implementation of the multi-line source depends on the required correlation function. According to one design, several temperature stabilized semiconductor lasers tuned to respective frequencies are employed; however, this design requires high accuracy of laser tuning. According to another design, a single modulated laser source may be used. For a spectrum comprising 3 lines, a conventional method of external modulation used earlier for generation of soliton light pulses, may be employed. In this method [J. J. Veselka and S. K. Korotky, "Pulse generation for soliton systems using lithium niobate modulators", IEEE J. Sel. Topics in Quantum Electronics, Vol. 2, p. 300, 1996], the light generated by a single CW semiconductor laser, is modulated by two or three $LiNbO_3$ modulators. If more spectral lines are required shorter pulses have to be generated. For generation of 5–9 lines separated by 5 GHz, a semiconductor laser may be internally modulated by a 5-GHz harmonic source below the laser threshold. This method produces chirped pulses of approximately 25–30 psec duration. For more lines, the externally modulated mode-locked semiconductor laser may be used where the limit for the number of lines is set by the gain bandwidth of the laser.

Figure 2:
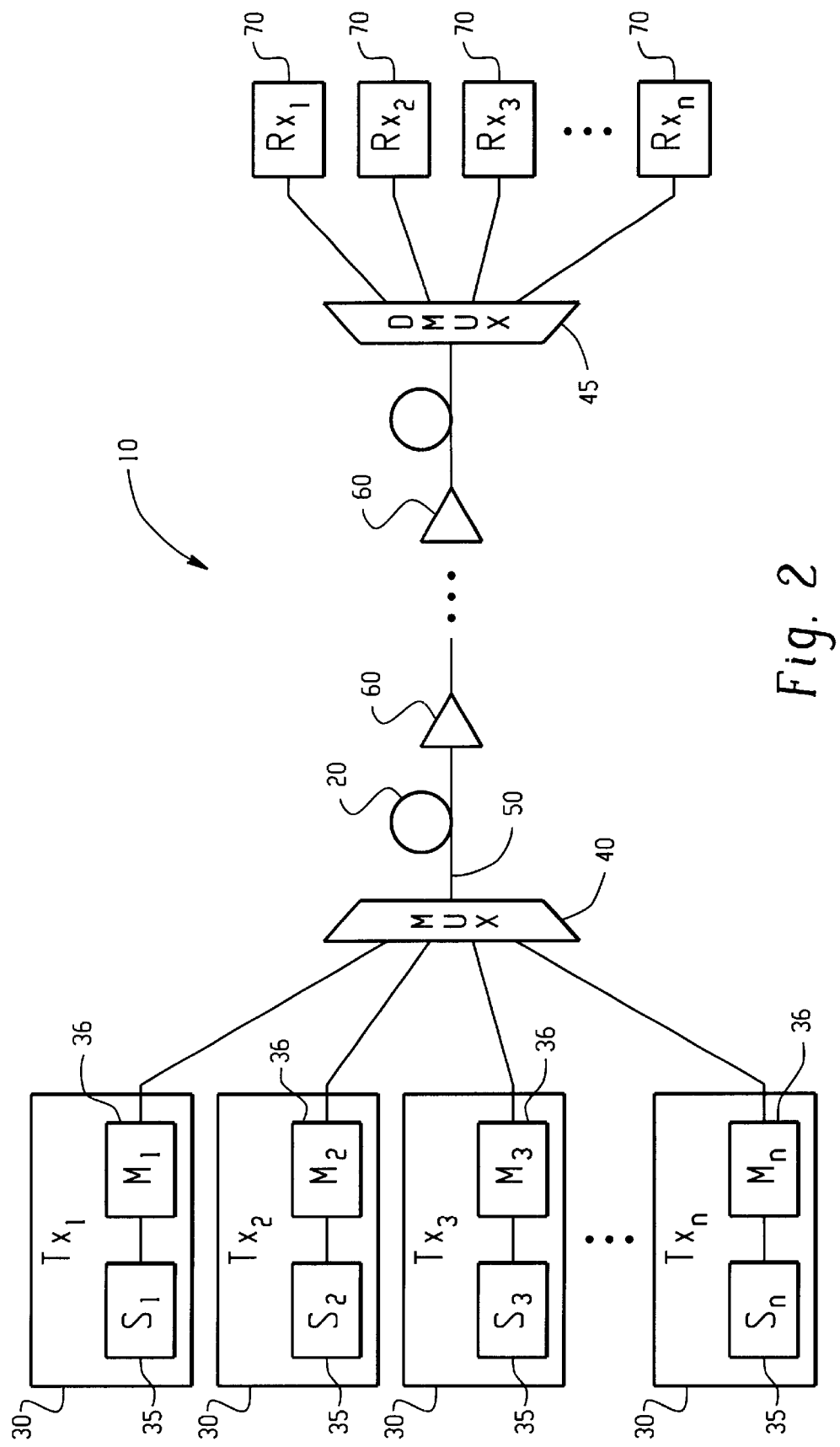
FIG. 2 shows a diagram of point-to-point WDM optical network according to the present invention.

As an example of a present invention, a WDM system 10 in a dispersion-shifted fiber 20 (DSF) is shown schematically in FIG. 2. The system comprises a plurality of WDM transmitters 30 ($Tx_1$, $Tx_2$, . . . $Tx_n$) with incorporated multi-line sources 35 ($S_1$, $S_2$, . . . $S_n$) and modulators 36 $M_1$, $M_2$, . . . $M_n$ for generating optical power and modulating it at the required rate and format. Multiplexer (MUX) 40 combines the WDM channels into a single fiber. A link 50 comprises the DSF fiber 20 with minimal dispersion in the 1545–1555nm range and optical amplifiers 60 spaced by 60–120 km. Demultiplexer (DMUX) 45 separates the WDM channels at the output of link 50. Receivers 70 detect and process the signal. A power of 0 dBm to several dBm can be launched within DSF without suffering penalties from four-wave mixing. The rate can be any standard rate, including SONET OC-48 and OC-192.

The sources $S_1$, $S_2$. . . $S_n$ incorporated in the respective transmitters $Tx_1$, $Tx_2$, . . . $Tx_n$ are MLS, each MLS comprising several frequency lines separated from each other evenly in the frequency space. The MLS can be implemented in several techniques, including mode-locked lasers, gain-switched lasers, frequency-chirped sources, phase modulated sources, arrays of discrete temperature-controlled, and pulsed sources with a duty cycle in the range of 33% to 5%. The modulator can be integrated into the source, or can be applied externally to the optical power generated by the source.

According to another embodiment, DSF may be substituted by SMF, and the launched power per channel may be increased by the factor equal to the number of spectral lines (or by a similar factor taking into account the non-rectangular shape of the source spectrum).

Figure 3:
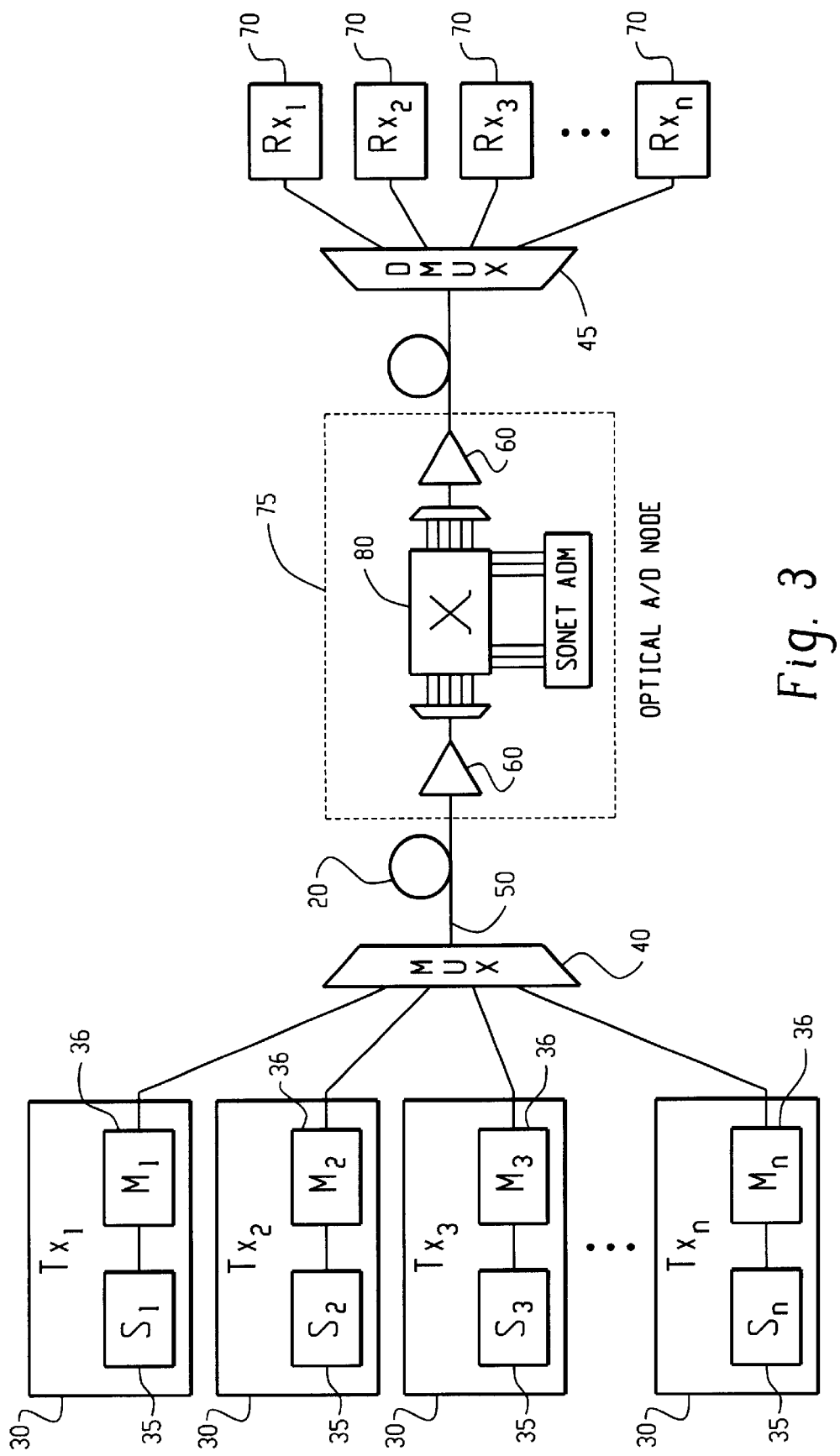
FIG. 3 shows a point-to-point WDM network with an intermediate Add/Drop node according to the present invention.

According to yet another embodiment a WDM system on DSF, SMF, standard non-dispersion-shifted fiber (NDSF) or non-zero dispersion-shifted fiber (NZ-DSF) comprises add-drop nodes as shown in FIG. 3. The system layout is similar to the system shown in FIG. 2; however, this system includes at least one optical add-drop node 75 with SONET ADM to allow access to some or all WDM channels in intermediate locations along the network. An optical ADM can be implemented in different embodiments. Preferably it is a fully reconfigurable ADM, with 2×2 switches routing each input WDM channel either to the "drop port" for further electronic processing by a SONET terminal equipment, or to continue propagating through the network. After a channel is dropped, its wavelength is reused by the new traffic signal at the "add" port through the 2×2 switch and back to the network. The switch extinction ratio (typically −25 to −40 dB)in conventional WDM networks may be substantially reduced if the MLS is employed. The non-adjacent channel cross-talk of the MUX/DMUX can also be allowed to be higher (typically a cross-talk of ~−25 dB is allowed in conventional WDM network architectures).

Another optical network element that is limited by coherent cross-talk is a transparent cross-connect switch. At each cross-connect node, a switch fabric exists which is comprised of individual switch elements. As the various switch elements route the signal to its desired output port, a certain amount of power leaks due to imperfect switch extinction which is then routed to non-desired ports. Therefore, at the output of the cross-connect a certain amount of cross-talk is expected at each port which is injected directly back into the network. Similar to the ADM cross-talk, the cross-talk generated at each OXC is added to the cross-talk contributed by all preceding nodes. The more OXC and ADM nodes a signal passes before being electrically detected and regenerated, the lower is the cross-talk level allowed at the output of each node, as the expressions (3) and (4) for $P_c$ and $P_i$ indicate. In a typical existing WDM network architecture, the cross-talk levels are restricted to below −40 to −50 dB. The resulting individual switch element extinction ratio depends on the specific switch architecture [R. A. Spanke, et al., IEEE J. QE, QE-22, p. 964, 1986], and the expected additional coherent cross-talk accumulation inside the switch fabric [D. J. Blumenthal, et al., IEEE PTL Vol. 8, p. 284, 1996]. Switch element extinction ratio levels substantially higher than 20 dB, and in some switch architectures as high as 40 to 50 dB are required to meet the above node cross-talk specification. This requirement in networks using standard coherent laser sources is very demanding for optical switch technologies, particularly in large size switch matrices (on the order of 100s of inputs×100s of outputs), and cannot be achieved with many existing device technologies. If, however, incoherent interference is considered, the node output cross-talk requirement can be relaxed by up to 20 dB, and the switch element extinction is further relaxed by the substantial reduction of coherent cross-talk accumulation inside the switch fabric itself.

Figure 4:
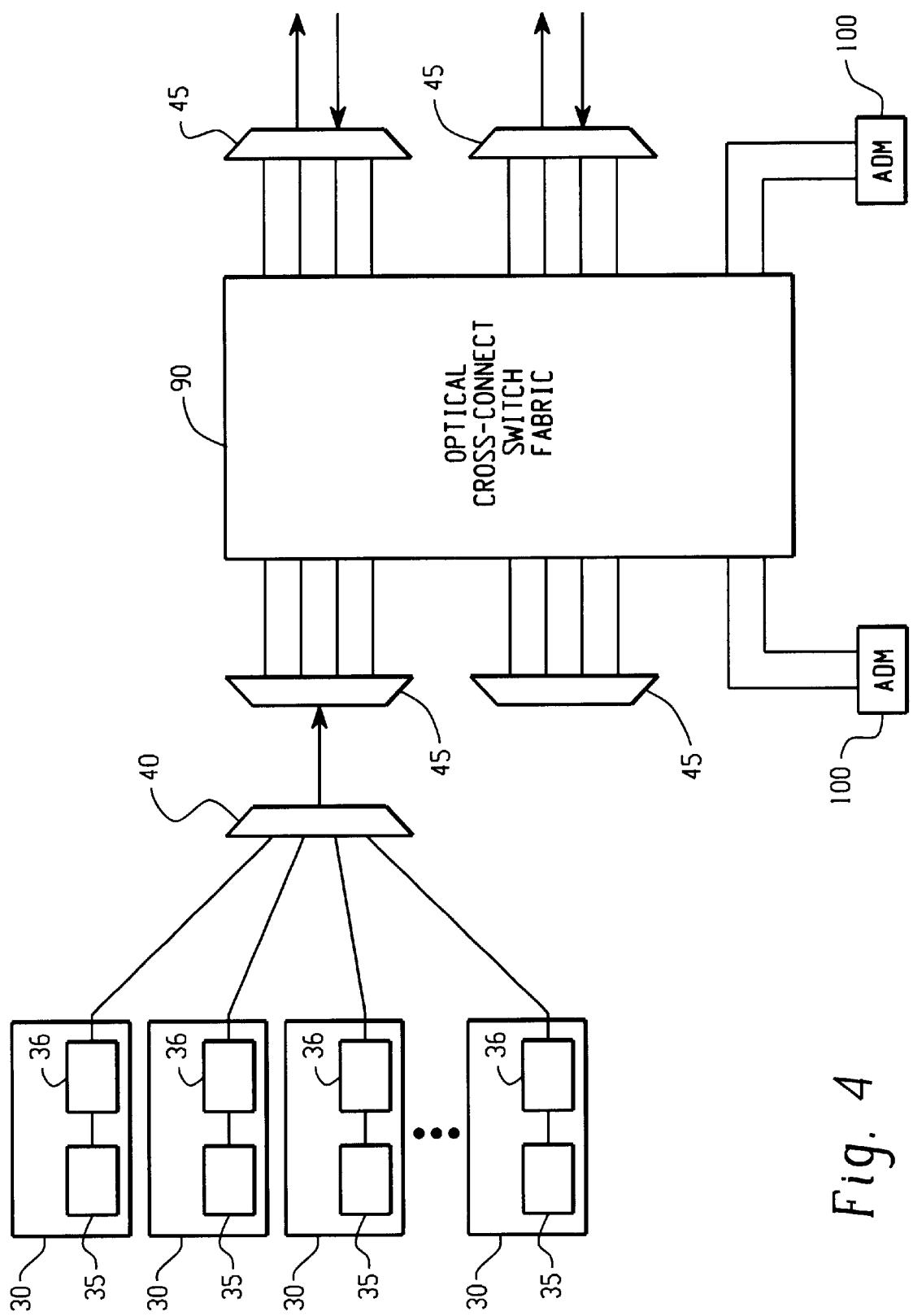
FIG. 4 shows an optical switch fabric cross-connecting any of input WDM channels to any of the output allocated WDM channels.

In FIG. 4, a schematic of a possible implementation of a transparent optical switch fabric is shown. The optical switch 90 can be a part of a large optical cross-connect or a router, or it can comprise these network elements entirely. When a MLS 30 is used in a combination with this switch fabric, the output system cross-talk is reduced, as well as the switch element extinction ratio (to as low as 10 to 15 dB, depending on the switch fabric architecture). The switch 90 can be implemented in a variety of techniques known in the art, including, mechanical, polymer, lithium niobate, silica, and micro-electro-mechanical switches. Some of the input ports can be allocated for ADMs 100, as shown in the example of FIG. 4.

While there have been shown and described what are at present considered preferred embodiments of the present invention, it will be obvious to those skilled in the art that various changes and its implementations in the transmission line as well as modifications and implementation of the multi-line optical source may be made to achieve a high quality transmission of the optical signals via WDM optical network without departing from the scope of the invention as defined by the appended claims.

What is claimed is:

1. A method of transmitting optical signals generated by multi-line source via WDM multi-channel optical network, comprising the steps of:

generating light within plurality of designated spectral ranges $\Delta\Omega$ of respective plurality of WDM optical channels, each said designated spectral range $\Delta\Omega$ comprising N spectral lines, wherein N is an integer greater than zero, each said spectral line having a spectral width $\Delta\omega$, said $\Delta\omega<<\Delta\Omega/N-1$;

modulating said light within each WDM optical channel by a respective electrical signal for obtaining a respective modulated optical signal;

propagating modulated optical signals via respective WDM optical channels via an optical fiber of said WDM optical network; and detecting said propagated optical signal, wherein products of non-linear optical interaction of said propagated optical signal within said plurality of WDM optical channels are suppressed; and wherein the ratio of $\Delta\Omega/N-1$ is a spectral separation between adjacent spectral lines, said spectral separation exceeding a spectral bandwidth of said electrical signal.

2. The method of claim 1, wherein the step of modulating said light comprises modulating all spectral lines within said designated spectral range $\Delta\Omega$.

3. The method of claim 2, wherein said step of modulating comprises modulating an optical field of said light by amplitude.

4. The method of claim 3, wherein said modulated optical signals are propagated via a dispersion shifted optical fiber.

5. The method of claim 3, wherein said modulated optical signals are propagated via a single mode optical fiber.

6. A method of transmitting optical signals generated by multi-line source through WDM multi-channel optical network, comprising the steps of:

generating light within a plurality of designated spectral ranges $\Delta\Omega$ of a respective plurality of WDM optical channels, each said designated spectral range $\Delta\Omega$ comprising N spectral lines, wherein N is an integer greater than zero, each said spectral line having a spectral width $\Delta\omega$, said $\Delta\omega<<\Delta\Omega/N-1$;

modulating said light within said plurality of WDM optical channel by a respective plurality of electrical signals for obtaining a respective plurality of modulated optical signals;

propagating said plurality of modulated optical signals via said plurality of WDM optical network; and detecting said propagated optical signals, wherein linear coherent crosstalk is suppressed; and wherein the ration of $\Delta\Omega/N-1$ is a spectral separation between adjacent spectral lines, said spectral separation exceeding a spectral bandwidth of said electrical signal.

7. The method of claim 6, wherein the step of modulating said light comprises modulating all spectral lines within said designated spectral range $\Delta\Omega$.

8. The method of claim 7, wherein said step of modulating comprises modulating an optical field of said light by amplitude.

9. The method of claim 8, wherein said modulated optical signals are propagated via add/drop multiplexer.

10. The method of claim 9, wherein said modulated optical signals are propagated via optical cross-connect.

* * * * *

UNITED STATES PATENT AND TRADEMARK OFFICE
CERTIFICATE OF CORRECTION

PATENT NO. : 6,607,311 B1
DATED : August 19, 2003
INVENTOR(S) : Fishman et al.

It is certified that error appears in the above-identified patent and that said Letters Patent is hereby corrected as shown below:

<u>Title page,</u>
Item [73], Assignee, insert -- Futurewei Technologies, Inc. --

<u>Column 3,</u>
Line 67, delete "30"

Signed and Sealed this

Sixth Day of January, 2004

JAMES E. ROGAN
*Director of the United States Patent and Trademark Office*

UNITED STATES PATENT AND TRADEMARK OFFICE
CERTIFICATE OF CORRECTION

| | |
|---|---|
| PATENT NO. | : 6,607,311 B1 |
| APPLICATION NO. | : 09/527040 |
| DATED | : August 19, 2003 |
| INVENTOR(S) | : Ilya M. Fishman et al. |

It is certified that error appears in the above-identified patent and that said Letters Patent is hereby corrected as shown below:

Title page, Item (54) and In the Specifications, Column 1 - The title should read, "METHOD AND SYSTEM OF TRANSMITTING OPTICAL SIGNALS GENERATED BY MULTI-LINE SOURCES VIA WDM OPTICAL NETWORK".

Title page, Item (56) - The first reference should read as follows: F. Forghieri, et al., "Fiber Nonlinearities and Their Impact on Transmission Systems", Chapter 8 in Optical Fiber Communication Systems, vol. 111A, Ed. I Kaminow, Academic Press, San Diego, p. 196, 1997.

Title page, Item (56) - The second reference should read as follows: E. Goldstein, et al., "Scaling Limitations in Transparent Optical Networks Due to Low-Level Crosstalk", IEEE PTL, vol. 7, p. 93, 1995.

Title page, Item (56) - The third reference should read as follows: "Fiber Optic Test and Measurement", edited by D. Derickson, Appendix A, HP Company, 1998.

Title page, Item (56) - The fourth reference should read as follows: J. Veselka and S. Korotky, "Pulse Generation for Soliton Systems Using Lithium Niobate Modulators", IEEE J Sel. Topics in Quantum Electronics, vol. 2, p. 300, 1996.

Title page, Item (56) - The fifth reference should read as follows: R. Spanke, et al., "Architectures for Large Nonblocking Optical Space Switches", IEEE J QE, QE-22, p. 964, 1986.

Title page, Item (56) - The sixth reference should read as follows: D. Blumenthal, et al., "BER Floor due to Heterodyne Coherent Crosstalk in Space Photonic Switches for WDM Networks", IEEE PTL, vol. 8, p. 284, 1996.

Signed and Sealed this
Fourth Day of June, 2013

Teresa Stanek Rea
*Acting Director of the United States Patent and Trademark Office*